United States Patent Office 3,701,817
Patented Oct. 31, 1972

3,701,817
HALOGENATED PHOSPHORUS COMPOUNDS CONTAINING THE ATOM SKELETON P—(C—P)₂ OR P—(C—P)₃ AND PREPARATION
Ludwig Maier, Zurich, Switzerland, assignor to Monsanto Company, St. Louis, Mo.
No Drawing. Filed Mar. 28, 1969, Ser. No. 811,638
Int. Cl. C07f 9/32, 9/40
U.S. Cl. 260—932                                    3 Claims

ABSTRACT OF THE DISCLOSURE

Compounds of the formula $$P(O)_a(OC_2H_5)_b[C(H)_cX_{2-c}P(O)(OC_2H_5)_2]_{3-b}$$

and processes for making by halogenating a compound of the formula $$P(O)_a(OC_2H_5)_b[CH_2P(O)(OC_2H_5)_2]_{3-b}$$

The compounds are used as complexing agents and flame-proofing agents.

---

The present invention relates to halogenated phosphorus compounds containing the atom skeleton

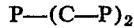

or P—(C—P)₃ and process for preparing. These halogenated phosphorus compounds have the formula:

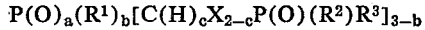

in which R¹, R² and R³ signify possibly substituted and/or ethylenically or acetylenically unsaturated hydrocarbon groups or heterocyclic groups attached through a carbon atom, RO groups, where R is the group of a hydroxyl compound, HO groups, MO groups, where M is a metal atom, ammonium or substituted ammonium, X a chlorine atom, bromine atom or fluorine atom and $a$, $b$ and $c$ each zero or 1. Normally, each R group, i.e., R¹, R², R³, etc., will not have more than 24 carbon atoms and for some uses not more than 8 carbon atoms.

The above formulated phosphorus compounds having the grouping

P—(C—P)₂ or 3 which can contain up to 6 ester groups or acid groups and whose phosphorus atoms are linked together through halogenated methyl groups have not been known up to now.

It is well known to prepare the corresponding halomethylenediphosphonic acid tetraester or dihalomethylenediphosphonic acid tetraester by reacting a sodium-methylenediphosphonic acid tetraester with chlorine or bromine (British Pat. 1,026,366, issued Apr. 20, 1966). It is also well known to prepare the halogen derivatives by reacting a methylenediphosphonic acid ester in aqueous solution or suspension with KOCl or KOBr (aqueous solution of KCO₃+chlorine or bromine) (O. T. Quimby et al., J. Org. Chem. 32, 4111 (1967). It is also well known to hydrolyze these esters to the corresponding acids.

It has now been found that phosphorus compounds having the atomic skeleton shown above can also be reacted in similar manner. In addition, it has now been found that even all methylene groups present can be halogenated. Either one or both hydrogen atoms of a methylene group can be replaced by halogen atoms.

The complete substitution can be represented by the following scheme:

(1)
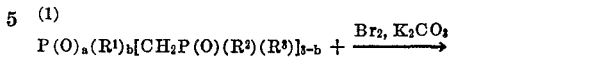

wherein in these formulae R¹, R², R³, $a$ and $b$ have the same significance as above, except that R¹, R² and R³ cannot be HO groups or MO groups during the reaction. Also, if desired, only one or two of the 2 to 3 methylene bridges present can be halogenated.

As compared with the already known halomethylene-bis-phosphonic acds and the esters thereof, the compounds of invention possess the atom skeleton

P—(C—P)₂ or P—(C—P)₃ and may have up to six ester groups or hydroxyl groups attached to the phosphorus atoms. This fact renders them superior with respect to their properties and possible uses. If they bear similar groups to these prior art compounds, the novel esters display, for example, generally higher boiling points and consequently to the extent that they are liquids, also a broader liquid range.

The complexing power, the emulsifying or dispersing ability and the thermal resistance are better for the compounds of this invention as compared with the well-known compounds.

Therefore, the compounds of this invention are better suited for uses such as complexing agents, flameproofing agents, fungicides, surfactants, plasticizers, hydraulic fluids, corrosion inhibitors, stabilizers for peroxides, additives to electrolytic baths, heat transfer agents, lubricants, oil additives, gasoline additives and additives to detergents, and they provide technical advantages. The acids formed by hydrolysis of the ester groups can be used in aqueous solution in the form of salts, e.g. sodium salts, potassium salts, or amine salts. They can form soluble complexes with certain metals such as calcium, magnesium, aluminum, iron, copper, lead, silver and uranium. However, such complexes are also formed by the compounds of invention containing 2 to 6 hydroxyl groups instead of ester groups, or besides hydroxyl groups still 1 to 5 ester groups. In general, the complexing power increases with the number of ester groups or hydroxyl groups. As compared with the simple halogenated methylenediphosphonic acid tetraesters, the esters herein described, as a rule, are thermally more stable. Some of the novel compounds, e.g. the phosphine oxides such as tris - (O,O' - diethyl - phosphonylhalomethyl)-phosphine oxide and bis-(O,O'-diethyl-phosphonylhalomethyl)-methylphosphine oxide, display an unusual absorption capacity in that they bind a multiple of their weight of many solvents or organic liquids so strongly that a gel is formed similar to the solutions of certain polymers. Such phosphine oxides therefore are especially suited for the fixation of certain liquid compounds, e.g. essential oils and plasticizers.

The conversion of the esters to the corresponding acids can be achieved by simple heating with concentrated HCl or HBr. A particular advantageous method for preparing the free acids is based on the thermal decomposition of corresponding isopropyl esters. Propylene is split off quantitatively at about 180 to 200°, leaving the acid in 100% yield. The free acids are less and less soluble in water with increasing content of carbon atoms and organic groups. Water-soluble salts are obtained by neutralization with alkali hydroxides, alkali carbonates, ammonia or amines.

The acids are used preferably in form of alkali salts as additives to detergent compositions. Numerous detergent compositions are well-known which contain complexing agents such as sodium tripolyphosphate, sodium hexametaphosphate, tetrasodium pyrophosphate, trisodium nitrilotriacetate, tetrasodium ethylenediaminetetraacetate, tetrasodium methylenediphosphonate, tetrasodium hydroxyethylidenediphosphonate etc., in order to eliminate the harmful effect of the scale-forming compounds of the water (calcium, magnesium) during laundering, or of metal traces (iron, copper) on the stability of oxygen bleaching agents (perborates) or chlorine bleaching agents (alkali hypochlorites, trichlorosiocyanuric acid, sodium dichloroisocyanurate). These complexing agents can be replaced totally or partly by the compounds of invention containing at least one MO group, where M is preferably a sodium atom.

The starting compounds necessary in the present process can be prepared by, for example, reacting a bis-chloromethylphosphorus compound or tris-chloromethylphosphorus compound of the general formula $$P(O)_a(R^1)_b(CH_2Cl)_{3-b}$$

in which $R^1$, $a$ and $b$ are defined as above, except that $R^1$ cannot be a HO group or MO group, with a phosphorus acid triester, phosphonous acid diester or phosphinous acid triester of the general formula $$P(R^2)(R^3)OR^4$$

in which $R^2$ and $R^3$ have the same significance as above, except that they cannot be HO groups or MO groups, and $R^4$ signifies an aliphatic, cycloaliphatic or aralkylic hydrocarbon group, whose chlorine derivative $R^4Cl$ will be volatile at the reaction temperature and pressure employed, i.e. at a temperature between about 140 and 200° C. and continuously removing by distillation, possibly under reduced pressure, i.e., the alkyl chloride, cycloalkyl chloride or aralkylchloride formed as a by product. This process has been described in copending application Ser. No. 690,418, filed Dec. 14, 1967, where an enumeration of possible examples of groups $R^1$, $R^2$ and $R^3$ are presented.

A practical method of carrying out the process is to add the stoichiometric amount of alkali hypohalogenide to the starting compound to be halogenated which is expediently in form of an alkaline aqueous solution or suspension.

Instead of adding an alkali hypohalide solution, there can be added gradually the halogen to the alkaline reaction mixture. For example, chlorine is bubbled in or bromine is added drop by drop at a rate such that decoloration occurs before the next drop is added. The halogenation proceeds at low temperatures. The halogenation can be carried out at room temperature and since the halogenation is an exothermic reaction, care has to be taken to provide adequate cooling when making in large batches, so that the temperature does not exceed about 50° C. and preferably remains at about room temperature. In this manner it is feasible to replace one or both hydrogen atoms of a methylene group by halogen.

Furthermore, one hydrogen atom of the methylene group in the starting compound can be replaced by an akali metal atom. This metallation is carried out in known manner in an inert solvent. The hydrogen atom of the methylene group is sufficiently acidic to enable the reaction to be carried out with a sodium dispersion or potassium dispersion. Then halogen is added to the alkali derivative, again taking care that by cooling the temperature does not rise higher than about 50° C. and expediently stays at about 15 to 30° C.

EXAMPLE 1

Preparation of $OP[CBr_2P(O)(OC_2H_5)_2]_3$ 12.5 g. (0.025 mol) of tri-(O,O'-diethylphosphonylmethyl)-phosphine oxide are added to a solution of 310 g. (2.25 mols) of potassium carbonate in 255 ml. of water. To this solution or emulsion are slowly added drop by drop 28 g. (0.175 mol) of bromine at 40° C. The bromine is added so that decoloration occurs before adding the next drop. The phosphine oxide dissolves during the reaction and a precipitate of KBr is formed. After 7 hours all the bromine has been added and the solution is stirred for another hour. The separated KBr is filtered off. Two layers are formed in the filtrate. The oily layer is separated and the aqueous layers extracted with chloroform. The extract and the oily part are combined and concentrated by evaporation. Yield 15.1 g. (62%) of tris-(O,O'-diethylphosphonyldibromomethyl)-phosphine oxide; M.P. 67 to 80° C.

The $H^1$—NMR spectrum confirms the structure: $CH_3CH_2O$ at 1.31 $\delta$ (18 H, calc'd 18 H) and $CH_2O$ at 4.17$\delta$ (13.4 H, calc'd 12.0 H). The quartet for $PCH_2P$ at 2.93$\delta$ of the starting compound is absent.

EXAMPLE 2

Preparation of $OP[CCl_2P(O)(OC_2H_5)_2]_3$

To a solution or emulsion of 12.5 g. (0.025 mol) of tri-(O,O' - diethylphosphonylmethyl)-phosphine oxide in 220 ml. of water are added by drops 13.1 g. of NaOCl (50 g. solution, containing about 12% active chlorine). The reaction mixture is extracted with chloroform and the extract concentrated by evaporation. Yield 15.1 g. (100%) of tris-(O,O'-diethylphosphonyldichloromethyl)-phosphine oxide, which softens at 66° C. and gives a clear melt at 130° C. The $H^1$—NMR spectrum confirms the structure: $CH_3CH_2O$ at 1.0 to 1.58$\delta$ (18 H, calc'd 18 H) and $CH_2O$ at 3.5 to 4.6$\delta$ (12.8 H, calc'd 12 H). The quartet for $PCH_2P$ at 2.77$\delta$ of the starting compound is absent.

EXAMPLE 3

Preparation of $OP[CBr_2P(O)(OH)_2]_3$ 1 g. of the compound of Example 1 is refluxed with concentrated hydrochloric acid for 25 hours. Then, the mixture is concentrated by evaporation and, in order to remove the adhering hydrochloric acid is concentrated three more times after addition of alcohol. The residue is suspended in alcohol, filtered and dried.

Yield 0.3 g. (36.3%) of tris-(dihydroxyphosphonyldibromomethyl)-phosphine oxide having 6 mol of water of crystallization. On titration the acid shows a break at pH 4.8 (equivalent weight found 298, calc'd 304.5); and a break at 8.3 (equivalent weight found 312, calc'd 304.5; total equivalent weight found 153, calc'd 152.2. The $H^1$—NMR spectrum shows the absence of $PCH_2P$ and gives only a signal for HO at 5.13$\delta$.

On evaporation of the alcohol there are obtained 0.3 g. of an unknown compound as a viscous liquid.

EXAMPLE 4

Preparation of $OP[CCl_2P(O)(OH)_2]_3$ 12 g. of the compound of Example 2 are refluxed with concentrated hydrochloric acid for 20 hours. The solution becomes yellow. The acid is obtained as a viscous liquid.

EXAMPLE 5

Preparation of $C_2H_5OP(O)[CBr_2P(O)(OC_2H_5)_2]_2$

To 11.8 g. (0.03 mol) of bis-(O,O'-diethylphosphonylmethyl)-phosphinic acid ethyl ester, 248 g. (1.8 mol) of potassium carbonate and 200 ml. of water there are added dropwise 22.3 g. (0.14 mol) of bromine so that the reaction mixture is just decolored each time.

The first half of bromine can be added with discoloration very fast (about 1 hour), while the second half reacts slower (about 4 hours). A white precipitate of potassium bromide is formed and separated by filtration. Two layers are formed in the filtrate. The oily layer is separated. The aqueous layer is saturated with sodium chloride and extracted with chloroform. The extract and the oily portion are combined and concentrated by evaporation.

Yield 12.3 g. (58.8%) of bis-(O,O'-diethylphosphonyl-dibromomethyl)-phosphinic acid ethyl ester; waxy compound.

The $H^1$—NMR spectrum confirms the structure: $CH_3$ at 1.31% (15 H, calc'd 15 H); $CH_2O$ at 3.67 to 4.67% (10.8 H, calc'd 10.0 H). The quartet for $PCH_2P$ at 2.77% of the starting compound is absent.

EXAMPLE 6

Preparation of $HOP(O)[CBr_2P(O)(OH)_2]_2$

Upon boiling of the ester of Example 5 with concentrated hydrochloric acid for 20 hours there is obtained bis(dihydroxyphosphonyldibromomethyl)-phosphinic acid as a viscous oil in quantitative yield.

What I claim is:
1. A phosphorus compound having the formula
$$P(O)[C(Br)_2P(O)(OCH_2CH_3)_2]_3$$
2. A phosphorus compound having the formula
$$P(O)[C(Cl)_2P(O)(OCH_2CH_3)_2]_3$$
3. A phophorus compound having the formula
$$C_2H_5O—P(O)[C(Br)_2P(O)(OC_2H_5)_2]_2$$

References Cited

UNITED STATES PATENTS

| 3,422,021 | 1/1969 | Roy | 260—932 X |
| 3,422,137 | 1/1969 | Quimby | 260—932 X |
| 3,471,406 | 10/1969 | Budnick | 260—932 X |

OTHER REFERENCES

Quimby et al., Journal of Organic Chemistry, vol. 32, 4111–4114 (1967).

JOSEPH REBOLD, Primary Examiner

R. L. RAYMOND, Assistant Examiner

U.S. Cl. X.R.

260—501.21, 502.4 P, 969, 986

PO-1050
(5/69)

UNITED STATES PATENT OFFICE
CERTIFICATE OF CORRECTION

Patent No. 3,701,817     Dated  October 31, 1972

Inventor(s)  Ludwig Maier

It is certified that error appears in the above-identified patent and that said Letters Patent are hereby corrected as shown below:

In the heading to the printed specification, after line 8, insert -- Claims priority, application Switzerland, April 5, 1968, 5290 --.

Col. 5, line 11, "(58.8%)" should be -- (58.5%)

Col. 5, line 15, "1.31%" should be -- 1.31$\delta$ --.

Col. 5, line 15, "4.67%" should be -- 4.67$\delta$ --.

Col. 5, line 16, "2.77%" should be -- 2.77$\delta$ --.

Signed and sealed this 19th day of November 1974.

(SEAL)
Attest:

McCOY M. GIBSON JR.
Attesting Officer

C. MARSHALL DANN
Commissioner of Patents